(12) United States Patent
Cox et al.

(10) Patent No.: US 8,509,567 B2
(45) Date of Patent: Aug. 13, 2013

(54) HALF PIXEL INTERPOLATOR FOR VIDEO MOTION ESTIMATION ACCELERATOR

(75) Inventors: Mark Cox, Medford, MA (US); Vladimir Botchev, Nashua, NH (US); Ke Ning, Framingham, MA (US); Wei Zhang, Millis, MA (US); Marc Hoffman, Mansfield, MA (US)

(73) Assignee: Analog Devices, Inc., Norwood, MA (US)

( * ) Notice: Subject to any disclaimer, the term of this patent is extended or adjusted under 35 U.S.C. 154(b) by 1464 days.

(21) Appl. No.: 12/136,492

(22) Filed: Jun. 10, 2008

(65) Prior Publication Data

US 2009/0016634 A1 Jan. 15, 2009

Related U.S. Application Data (60) Provisional application No. 60/958,810, filed on Jul. 9, 2007.

(51) Int. Cl.
*G06K 9/32* (2006.01)
*G06F 7/38* (2006.01)
*G09G 5/00* (2006.01)

(52) U.S. Cl.
USPC ............ 382/300; 708/290; 708/313; 345/606

(58) Field of Classification Search
USPC ................ 382/162, 167, 199, 260–275, 299, 382/300; 708/290, 313; 348/441–459; 345/606–610, 698, 699; 375/240–241; 386/232, 233
See application file for complete search history.

(56) References Cited

U.S. PATENT DOCUMENTS

| 5,594,675 | A  | * | 1/1997  | Peng ............................. 708/313 |
| 6,097,855 | A  | * | 8/2000  | Levien .......................... 382/296 |
| 6,427,158 | B1 | * | 7/2002  | Wang et al. .................... 708/313 |
| 6,628,258 | B1 | * | 9/2003  | Nakamura ....................... 345/98 |
| 6,690,835 | B1 |   | 2/2004  | Brockmeyer et al. |
| 6,765,578 | B2 | * | 7/2004  | Slavin ........................... 345/472 |
| 6,950,469 | B2 |   | 9/2005  | Karczewicz et al. |
| 7,123,300 | B2 | * | 10/2006 | Compton ...................... 348/280 |

(Continued)

FOREIGN PATENT DOCUMENTS

CN 1835585 A 9/2006

OTHER PUBLICATIONS

Office Action dated Sep. 7, 2011 in the Chinese Application for Invention No. 200810133053.5, in 6 pages.

(Continued)

*Primary Examiner* — Aaron W Carter
(74) *Attorney, Agent, or Firm* — Knobbe Martens Olson & Bear LLP (57) ABSTRACT

Methods and an apparatus are provided for interpolation of pixels in a pixel array having rows and columns of pixels. The apparatus includes a shift register array to shift pixel values of the pixel array, the shift register array including two or more shift registers; an interpolation filter array interconnected to the shift register array, the interpolation filter array including one or more interpolation filters; and a controller configured to provide pixel values in columns of the pixel array from the shift register array to respective interpolation filters in a first mode and configured to provide pixel values in rows of the pixel array from the shift register array to respective interpolation filters in a second mode. The controller may be configured to supply vertical sub-pixel values from the shift register array to the interpolation filters to generate diagonal sub-pixel values.

26 Claims, 11 Drawing Sheets

(56) References Cited

U.S. PATENT DOCUMENTS

| | | | |
|---|---|---|---|
| 7,173,983 B1* | 2/2007 | Meyer | 375/340 |
| 7,548,941 B2* | 6/2009 | Hennedy | 708/319 |
| 7,812,875 B2* | 10/2010 | Takahashi et al. | 348/296 |
| 7,890,564 B2* | 2/2011 | Lai et al. | 708/313 |
| 2002/0054241 A1* | 5/2002 | Compton | 348/607 |
| 2002/0078114 A1* | 6/2002 | Wang et al. | 708/313 |
| 2006/0109910 A1 | 5/2006 | Nagarajan | |
| 2006/0133506 A1 | 6/2006 | Dang | |
| 2006/0244853 A1* | 11/2006 | Takahashi et al. | 348/296 |
| 2009/0016634 A1* | 1/2009 | Cox et al. | 382/260 |
| 2009/0225197 A1* | 9/2009 | Takahashi et al. | 348/240.2 |

OTHER PUBLICATIONS

Changqi Yang et al., "*High Performance VLSI Architecture of Fractional Motion Estimation in H.264 for HDTV*", IEEE, Feb. 2006, pp. 2605-2608.

Gary J. Sullivan, et al., "*Video Compression—From Concepts to the H.264/AVC Standard*", Proceedings of the IEEE, Jan. 2005, vol. 93, No. 1, pp. 18-31.

Thomas Wiegand, et al., "*Overview of the H.264/AVC Video Coding Standard*" IEEE Transactions on Circuits and Systems for Video Technology, Jul. 2003, vol. 13, No. 7, pp. 560-576.

\* cited by examiner

After 1st row loaded into shift register array s0 = 56 34 01 34 86 <u>14</u> <u>34</u> <u>65</u> <u>12</u>
                                    F3 F2 F1 F0

FIG. 6B

After 2nd row loaded into shift register array s0 = 01 33 17 89 47 <u>33</u> <u>55</u> <u>45</u> <u>23</u>
                                    F3 F2 F1 F0 s1 = 56 34 01 34 <u>86</u> <u>14</u> <u>34</u> <u>65</u> 12
                                 F3 F2 F1 F0

FIG. 6C

After 3rd row loaded into shift register array s0 = 37 51 31 23 28 <u>11</u> <u>53</u> <u>04</u> <u>03</u>
                                  F3 F2 F1 F0 s1= 01 33 17 89 <u>47</u> <u>33</u> <u>55</u> <u>45</u> 23
                                F3 F2 F1 F0 s2= 56 34 01 <u>34</u> <u>86</u> <u>14</u> <u>34</u> 65 12
                             F3 F2 F1 F0

FIG. 6D

After 4th row loaded into shift register array s0 = 12 73 54 42 12 $\underline{52}$ $\underline{47}$ $\underline{26}$ $\underline{25}$
                          F3 F2 F1 F0 s1 = 37 51 31 23 $\underline{28}$ $\underline{11}$ $\underline{53}$ $\underline{04}$ 03
                       F3 F2 F1 F0 s2 = 01 33 17 $\underline{89}$ $\underline{47}$ $\underline{33}$ $\underline{55}$ 45 23
                    F3 F2 F1 F0 s3 = 56 34 $\underline{01}$ $\underline{34}$ $\underline{86}$ $\underline{14}$ 34 65 12
                 F3 F2 F1 F0

FIG. 6E

After 5th row loaded into shift register array s0 = 33 32 11 11 25 $\underline{35}$ $\underline{11}$ $\underline{55}$ $\underline{43}$
                             F3 F2 F1 F0 s1 = 12 73 54 42 $\underline{12}$ $\underline{52}$ $\underline{47}$ $\underline{26}$ 25
                          F3 F2 F1 F0 s2 = 37 51 31 $\underline{23}$ $\underline{28}$ $\underline{11}$ $\underline{53}$ 04 03
                       F3 F2 F1 F0 s3 = 01 33 $\underline{17}$ $\underline{89}$ $\underline{47}$ $\underline{33}$ 55 45 23
                    F3 F2 F1 F0 s4 = 56 $\underline{34}$ $\underline{01}$ $\underline{34}$ $\underline{86}$ 14 34 65 12
                 F3 F2 F1 F0

FIG. 6F

After 6th row loaded into shift register array s0 = 55 34 65 14 15 $\underline{99}$ $\underline{88}$ $\underline{77}$ $\underline{24}$
                                F3 F2 F1 F0 s1= 33 32 11 11 $\underline{25}$ $\underline{35}$ $\underline{11}$ $\underline{55}$ 43
                          F3 F2 F1 F0 s2= 12 73 54 $\underline{42}$ $\underline{12}$ $\underline{52}$ $\underline{47}$ 26 25
                       F3 F2 F1 F0 s3= 37 51 $\underline{31}$ $\underline{23}$ $\underline{28}$ $\underline{11}$ 53 04 03
                    F3 F2 F1 F0 s4= 01 $\underline{33}$ $\underline{17}$ $\underline{89}$ $\underline{47}$ 33 55 45 23
                 F3 F2 F1 F0 s5= $\underline{56}$ $\underline{34}$ $\underline{01}$ $\underline{34}$ 86 14 34 65 12
         F3 F2 F1 F0

HALF PIXEL INTERPOLATOR FOR VIDEO MOTION ESTIMATION ACCELERATOR

CROSS REFERENCE TO RELATED APPLICATION

This application claims priority based on Provisional Application Ser. No. 60/958,810, filed Jul. 9, 2007, which is hereby incorporated by reference in its entirety.

FIELD OF THE INVENTION

This invention relates to compression of image data and, more particularly, to methods and apparatus for half pixel interpolation in a motion estimation unit.

BACKGROUND OF THE INVENTION

A video sequence consists of a series of frames. Each frame is represented by an array of pixels, such as, for example, 720×480 pixels, and each pixel is represented by a data value. Thus, a large volume of data is used to produce each frame.

An increasing number of video products, such as DVD players, digital TV, personal video recorders, multimedia jukeboxes, video-capable cell phones, to name a few, rely on video compression to reduce the number of bits required to store and/or transmit a video sequence. To improve video data compression efficiency, motion estimation may be performed. Motion estimation has proven to be effective in exploiting temporal redundancy of a video sequence by extracting a correlation between adjacent frames. In a sequence of frames, a current frame is predicted from a previous frame known as a reference frame. The current frame is usually divided into blocks or macroblocks. The size of the macroblocks is typically 16×16 pixels, but may vary depending on the compression standard used. Each macroblock in the current frame is compared to regions of the same size in the reference frame in order to locate the best matching macroblock, using a specified error criteria. A motion vector is used to represent the displacement between a macroblock in the reference frame and the matching macroblock in the current frame.

To satisfy the demand for visual communication applications, many video compression standards have been developed. Motion estimation is a central part of many video compression schemes. A key part of the MPEG-4 part 10/H.264 video coding standard requires that the encoder generates motion vectors to represent motion between two or more frames. The standard allows the encoder to generate motion vectors at half or quarter pixel accuracy, where the sub-pixel values are generated by interpolation filtering of existing integer values. This filtering process, known as sub-pixel interpolation, is extremely computation intensive and memory intensive, but is critical to achieving high quality encoding. Performing the task in hardware requires a balance between cycle count, which must be low enough to support low clock frequencies and large frame sizes, power consumption, circuit complexity, chip area and memory bandwidth.

Accordingly there is a need for improved methods and apparatus for sub-pixel interpolation.

SUMMARY OF THE INVENTION

According to a first aspect of the invention, apparatus is provided for interpolation of pixels in a pixel array having rows and columns of pixels. The apparatus comprises a shift register array to shift pixel values of the pixel array, the shift register array including two or more shift registers; an interpolation filter array interconnected to the shift register array, the interpolation filter array including one or more interpolation filters; and a controller configured to provide pixel values in columns of the pixel array from the shift register array to respective interpolation filters in a first mode and configured to provide pixel values in rows of the pixel array from the shift register array to respective interpolation filters in a second mode.

In some embodiments, the controller is configured to provide integer pixel values in columns of the pixel array to respective interpolation filters in the first mode to generate vertical sub-pixel values and is configured to provide integer pixel values in rows of the pixel array to respective interpolation filters in the second mode to generate horizontal sub-pixel values. The controller may be configured to provide vertical sub-pixel values to respective interpolation filters in the second mode to generate diagonal sub-pixel values.

The controller may be configured to sequence through the pixel array to generate vertical sub-pixel values in a first pass, to sequence through the pixel array to generate horizontal sub-pixel values in a second pass and to sequence through the vertical sub-pixel values to generate diagonal sub-pixel values in a third pass.

According to a second aspect of the invention, a method is provided for interpolation of pixels in a pixel array having rows and columns of pixels. The method comprises providing a shift register array including two or more shift registers and an interpolation filter array interconnected to the shift register array, the interpolation filter array including one or more interpolation filters; shifting pixel values of the pixel array through the shift registers of the shift register array; supplying pixel values in columns of the pixel array from the shift register array to respective interpolation filters in a first mode to generate vertical sub-pixel values; and supplying pixel values in rows of the pixel array from the shift register array to respective interpolation filters in a second mode to generate horizontal sub-pixel values.

According to a third aspect of the invention, apparatus is provided for filtering of data values in a data array having rows and columns of data values. The apparatus comprises a shift register array to shift data values of the data array; at least one digital filter interconnected to the shift register array; and a controller to supply data values in columns of the data array from the shift register array to the digital filter in a first mode and to supply data values in rows of the data array of the shift register array to the digital filter in a second mode.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
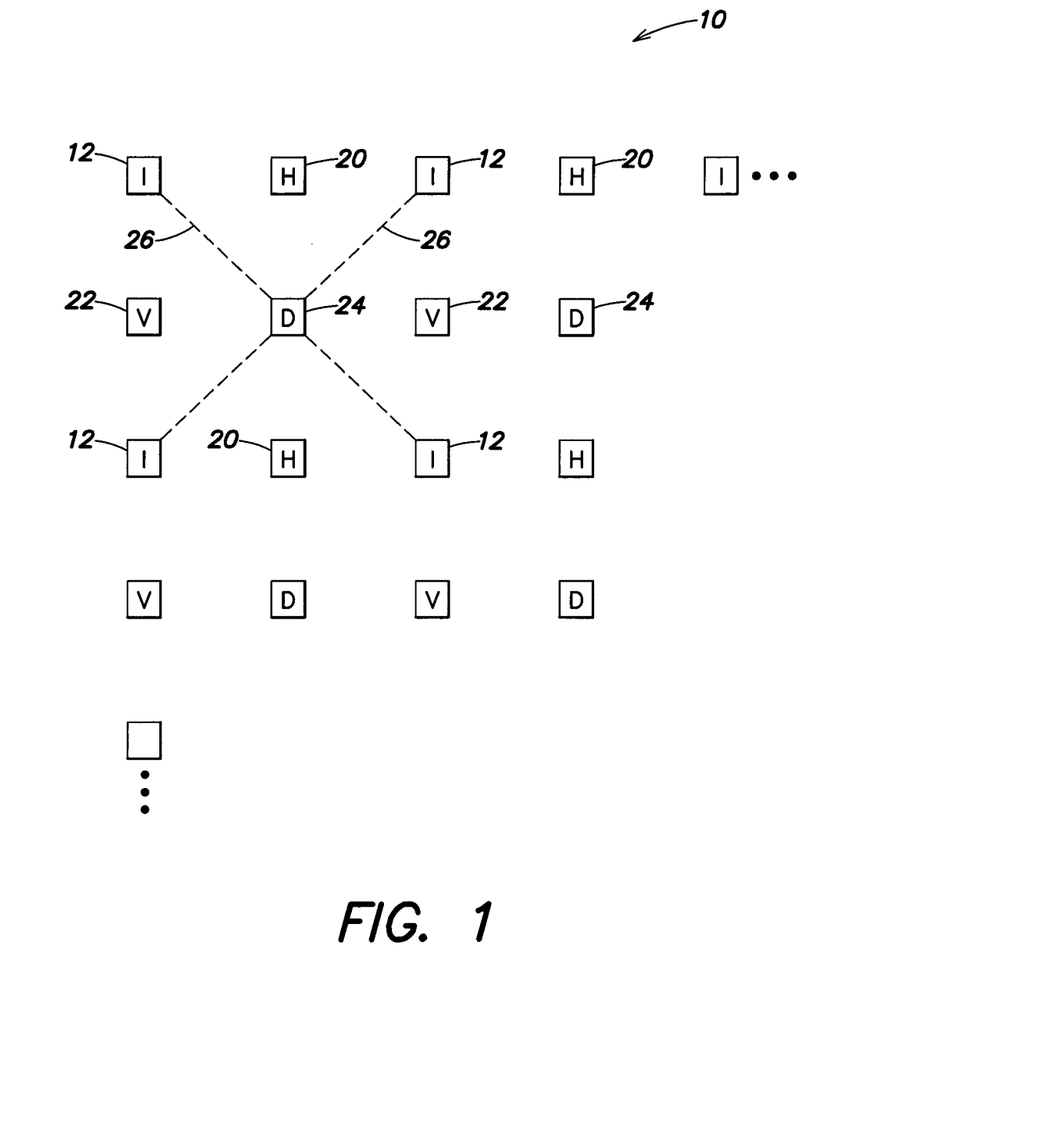
FIG. 1 is a schematic diagram of a portion of an image that illustrates half pixel interpolation in accordance with embodiments of the invention.

A schematic diagram of a few pixels of a pixel array 10 is shown in FIG. 1. The pixel array 10 is made up of integer pixels 12 arranged in an array of rows and columns. The spacing between pixels is exaggerated in FIG. 1 for purposes of illustration. The complete pixel array may have any number of pixels and may represent a part of an image or an entire image. In one embodiment, a 24×24 pixel block of the pixel array is processed to generate half pixels for a 16×16 pixel block. A 24×24 pixel block is utilized in order to generate half pixels near the edges of the 16×16 pixel block. Each of the integer pixels 12 has a pixel value, such as an 8-bit value.

Interpolation may be used to generate sub-pixel values, such as half pixel values or quarter pixel values. The embodiments described herein relate to generation of half pixel values. However, the invention is not limited to generation of half pixel values.

The half pixel interpolation process generates horizontal half pixels 20 between horizontally-aligned integer pixels 12 and vertical half pixels 22 between vertically-aligned integer pixels. In addition, the half pixel generation process optionally may generate diagonal half pixels 24 at the intersection of diagonal lines 26 connecting each 2×2 group of integer pixels. The half pixels are generated by interpolation of nearby pixels. The H.264 video coding standard specifies that horizontal half pixels and vertical half pixels are generated using a 6-tap interpolation filter with specified filter coefficients. Diagonal half pixels may be generated by interpolation of nearby vertical half pixels as described below. In the case of 6-tap interpolation filters, the value of each half pixel is based on the values of six nearby pixels.

The values of the filter coefficients determine the weight given to each nearby pixel in determining the sub-pixel value. According to the H.264 standard, half pixel values are calculated as follows.

$$z=(A-5B+20C+20D-5E+F)/32$$

where z is the half pixel value,

A, B, C, D, E and F are the six closest integer pixel values in a column to calculate a vertical half pixel value, A, B, C, D, E and F are the six closest integer pixel values in a row to calculate a horizontal half pixel value, and A, B, C, D, E and F are the six closest vertical half pixel values in a row to calculate a diagonal half pixel value.

In these embodiments, each horizontal half pixel is calculated by interpolation of the three closest integer pixels to the left and the three closest integer pixels to the right of the horizontal half pixel being calculated. Each vertical half pixel is calculated by interpolation of the three closest integer pixels above and the three closest integer pixels below the vertical half pixel being calculated. Each diagonal half pixel may be calculated by interpolation of the three closest vertical half pixels to the left and the three closest vertical half pixels to the right of the diagonal half pixel being calculated.

Figure 2:
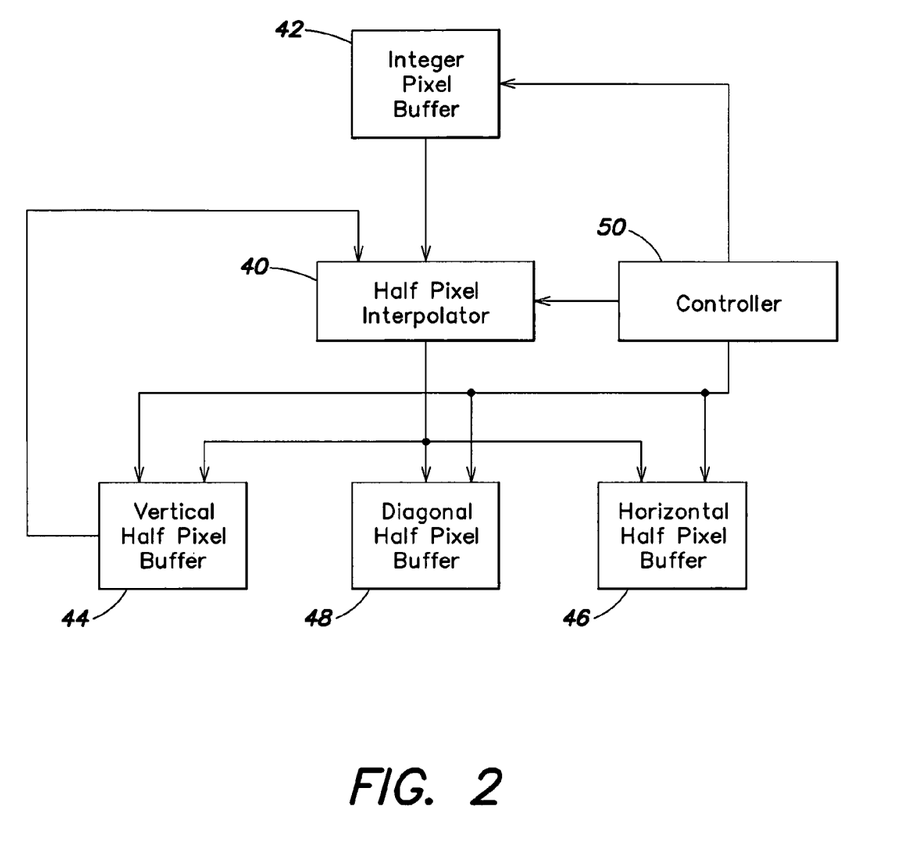
FIG. 2 is a schematic block diagram of a half pixel interpolation module in accordance with an embodiment of the invention.

A block diagram of a half pixel interpolation module in accordance with an embodiment of the invention is shown in FIG. 2. The half pixel interpolation module may be part of a motion estimation accelerator implemented on an integrated circuit chip. The motion estimation accelerator may operate with or be part of a Digital Signal Processor (DSP) or other programmable processor, such as a Micro-Controller Unit (MCU). The half pixel interpolation module includes a half pixel interpolator 40, an integer pixel buffer 42, a vertical half pixel buffer 44, a horizontal half pixel buffer 46, a diagonal half pixel buffer 48 and a controller 50.

The half pixel interpolator 40 receives integer pixel values from integer pixel buffer 42 and receives vertical half pixel values from vertical half pixel buffer 44. Half pixel interpolator 40 generates vertical half pixel values and stores the vertical half pixel values in vertical half pixel buffer 44, generates horizontal half pixel values and stores the horizontal half pixel values in horizontal half pixel buffer 46 and may generate diagonal half pixel values and store the diagonal half pixel values in diagonal half pixel buffer 48. As noted above, diagonal half pixels may be generated by interpolation of vertical half pixels. Accordingly, the calculated vertical half pixel values stored in vertical half pixel buffer 44 are supplied to the input of half pixel interpolator 40 for generating diagonal half pixels. The controller 50 controls half pixel interpolator 40 and buffers 42, 44, 46 and 48 to perform half pixel generation as described below.

In one embodiment, integer pixel buffer 42 holds a 24×24 block of integer pixel values, and each pixel value has 8 bits. In this embodiment, vertical half pixel buffer 44 has a capacity of 24×19 half pixel values of 16 bits each, horizontal half pixel buffer 46 has a capacity of 19×20 half pixel values of 8 bits each, and diagonal half pixel buffer 48 has a capacity of 19×19 half pixel values of 8 bits each. It will be understood that different buffer sizes may be utilized in different applications.

Figure 3:
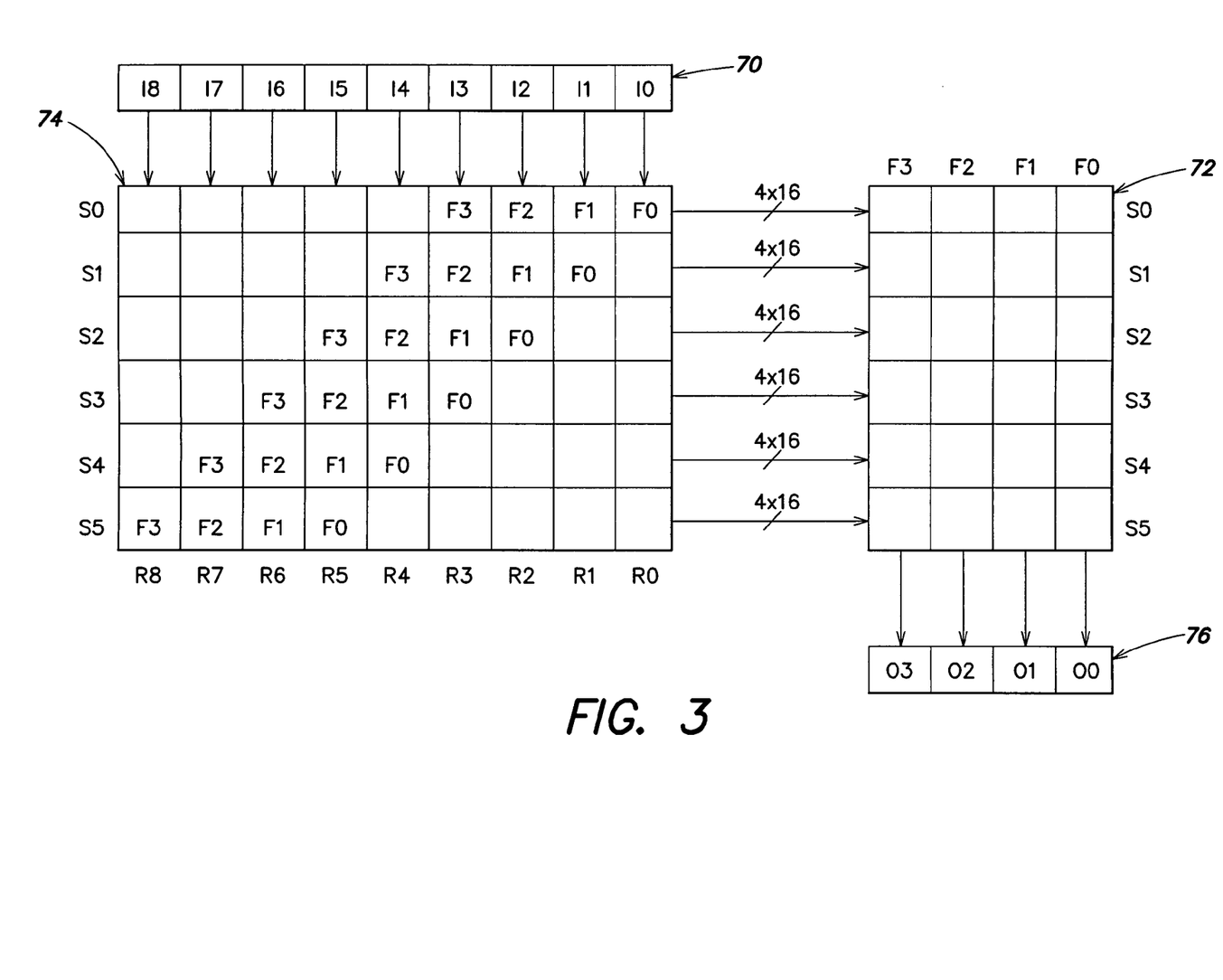
FIG. 3 is a schematic block diagram of the half pixel interpolator shown in FIG. 2.

A schematic block diagram of half pixel interpolator 40 in accordance with an embodiment of the invention is shown in FIG. 3. An input buffer 70 receives pixel values from integer pixel buffer 42 (FIG. 2) or from vertical half pixel buffer 44, depending on the half pixels being calculated. Half pixel interpolation is performed by an interpolation filter array 72 and a shift register array 74. In the embodiment of FIG. 3, interpolation filter array 72 includes four digital filters F0-F3, each having six stages S0-S5, and shift register array 74 includes nine shift registers R0-R8, each having six stages S0-S5. Each digital filter F0-F3 can be an FIR (Finite Impulse Response) interpolation filter. It will be understood that this configuration is given by way of example only and is not limiting as to the scope of the present invention.

The pixel values are supplied from input buffer 70 to shift register array 74 and are shifted downwardly through the stages of the shift register array 74 on successive clock cycles. Shift register array 74 is connected to interpolation filter array 72 as described below. In a first or vertical mode, the interpolation filters of interpolation filter array 72 select from shift register array 74 pixel values corresponding to columns of the pixel array. In a second or horizontal mode, the interpolation filters of interpolation filter array 72 select from shift register array 74 pixel values corresponding to rows of the pixel array.

The interpolation filter array 72 performs interpolation of the selected pixel values and provides the half pixel values to an output buffer 76. The half pixel values are stored from output buffer 76 to one of the half pixel buffers 44, 46 or 48 shown in FIG. 2, according to half pixel type. In the embodiment of FIG. 3, input buffer 70 has nine register locations [I0:I8] that hold 16-bit pixel values and output buffer 76 has four register locations [O0:O3] that hold 16-bit half pixel values [O0:O3].

A single interpolation filter array 72 performs vertical half pixel interpolation, horizontal half pixel interpolation and diagonal half pixel interpolation. This is achieved by connecting stages of the shift registers in shift register array 74 to corresponding stages of the interpolation filters in interpolation filter array 72. As shown in FIG. 3, first stages S0 of shift registers R0-R3 are connected to the first stages S0 of interpolation filters F0-F3, respectively; second stages S1 of shift registers R1-R4 are connected to the second stages S1 of interpolation filters F0-F3, respectively; and so on.

The connections are indicated in FIG. 3 by the numerals in the stages of shift register array 74. Thus for example, stage S0 of shift register R0 is connected to stage S0 of filter F0; stage S0 of shift register R1 is connected to stage 0 of filter F1; stage 0 of shift register R2 is connected to stage 0 of filter F2; and stage S0 of shift register R3 is connected to stage S0 of filter F3. Similarly, stage S5 of shift register R5 is connected to stage S5 of filter F0; stage S5 of shift register R6 is connected to stage S5 of filter F1; stage S5 of shift register R7 is connected to stage S5 of filter F2; and stage S5 of shift register R8 is connected to stage S5 of filter F3. It may be noted that the stages of shift register array 74 are connected to corresponding stages of interpolation filter array 72. "Corresponding stages" in shift register array 74 and interpolation filter array 72 have the same stage numbers. In addition, it may be noted that stages along a diagonal of shift register array 74 are connected to corresponding stages of the interpolation filters. This configuration permits horizontal interpolation and diagonal interpolation as described below. Vertical interpolation is achieved by connections between the first stages S0 of shift registers R0-R3 and the first stages of S0 of interpolation filters F0-F3, respectively.

Figure 4:
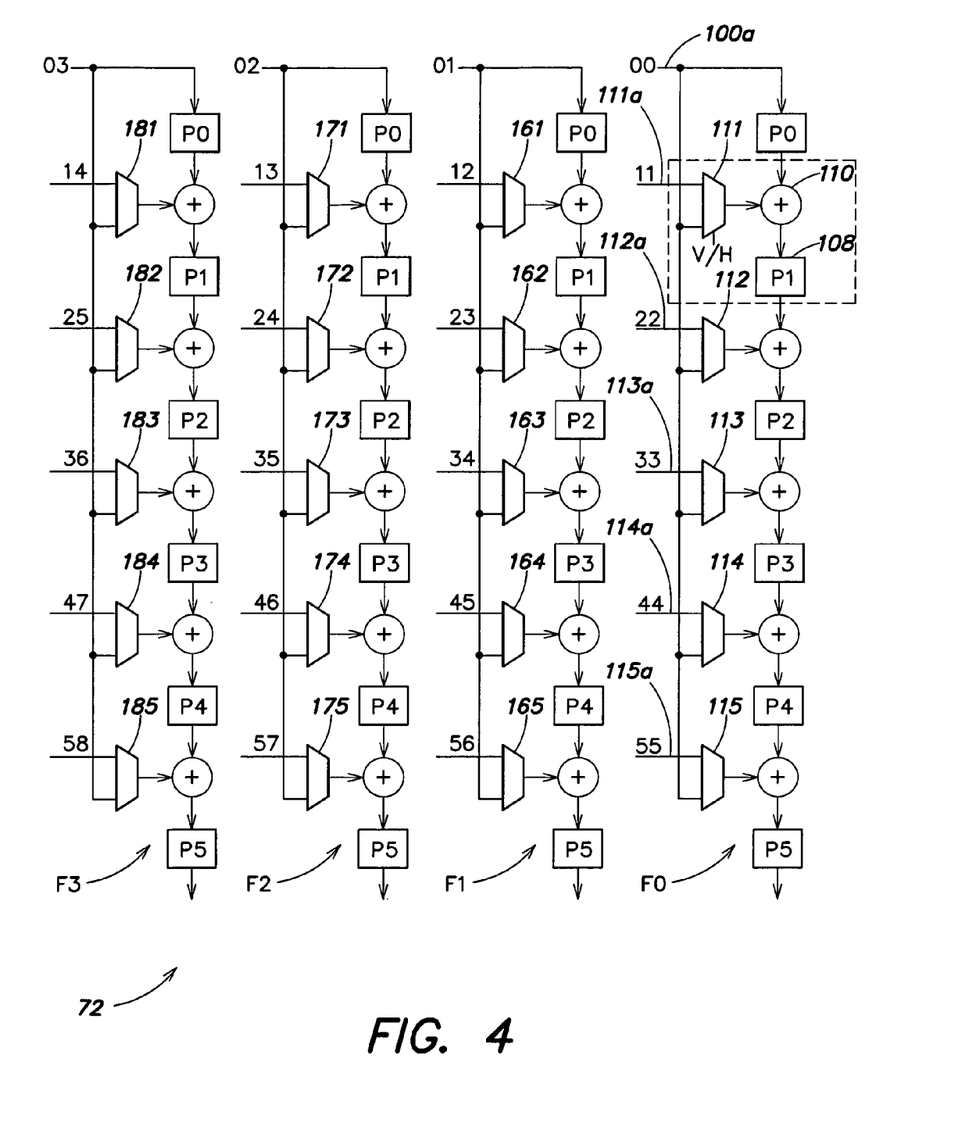
FIG. 4 is a schematic block diagram of the interpolation filter array shown in FIG. 3.

A schematic block diagram of interpolation filter array 72 in accordance with an embodiment of the invention is shown in FIG. 4. As shown, filter array 72 includes four interpolation filters F0, F1, F2 and F3. Each interpolation filter includes six taps, or stages. Each stage of each interpolation filter may include a latch, an adder, a multiplier and a multiplexer, as described below. In the embodiment of FIG. 4, multiplication is implemented by bit shifting, and multipliers are not utilized. The first stage does not require an adder. Furthermore, the multiplexer can be omitted from the first stage, since the first stage receives the same inputs in the first and second operating modes.

Each interpolation filter has a first input which is utilized during vertical half pixel interpolation and second inputs which are utilized during horizontal half pixel interpolation and diagonal half pixel interpolation. The first input is connected to the first stage S0 of a corresponding shift register of shift register array 74. The second inputs are connected to corresponding stages in predetermined shift registers in shift register array 74. Thus, for example, interpolation filter F0 receives a first input on line 100a and second inputs on lines 100a, 111a, 112a, 113a, 114a and 115a. Line 100a to the first stage S0 of filter F0 receives the same input in the first and second modes and does not require data selection.

The second stage of interpolation filter F0 includes a latch 108, an adder 110 and a multiplexer 111. The adder 110 receives the output of a previous stage and the output of multiplexer 111, and supplies the sum to latch 108. Multiplexer 111 receives a first input on line 100a from stage S0 of shift register R0 and receives a second input on line 111a from stage S1 of shift register R1. Interpolation filter F0 includes multiplexers 111, 112, 113, 114 and 115 in the second through sixth stages, respectively. Each multiplexer is controlled in accordance with the mode of operation. In the first mode, each multiplexer supplies the first input on line 100a to each stage of the interpolation filter. In the second mode, each multiplexer supplies pixel values from shift register array 74 to corresponding stages of the interpolation filter. In this embodiment, multiplication of each pixel value by a filter coefficient is implemented by bit shifting of the pixel value supplied to adder 110. Each interpolation filter F0, F1, F2 and F3 may have the same structure, with different inputs as appropriate.

Figure 5:
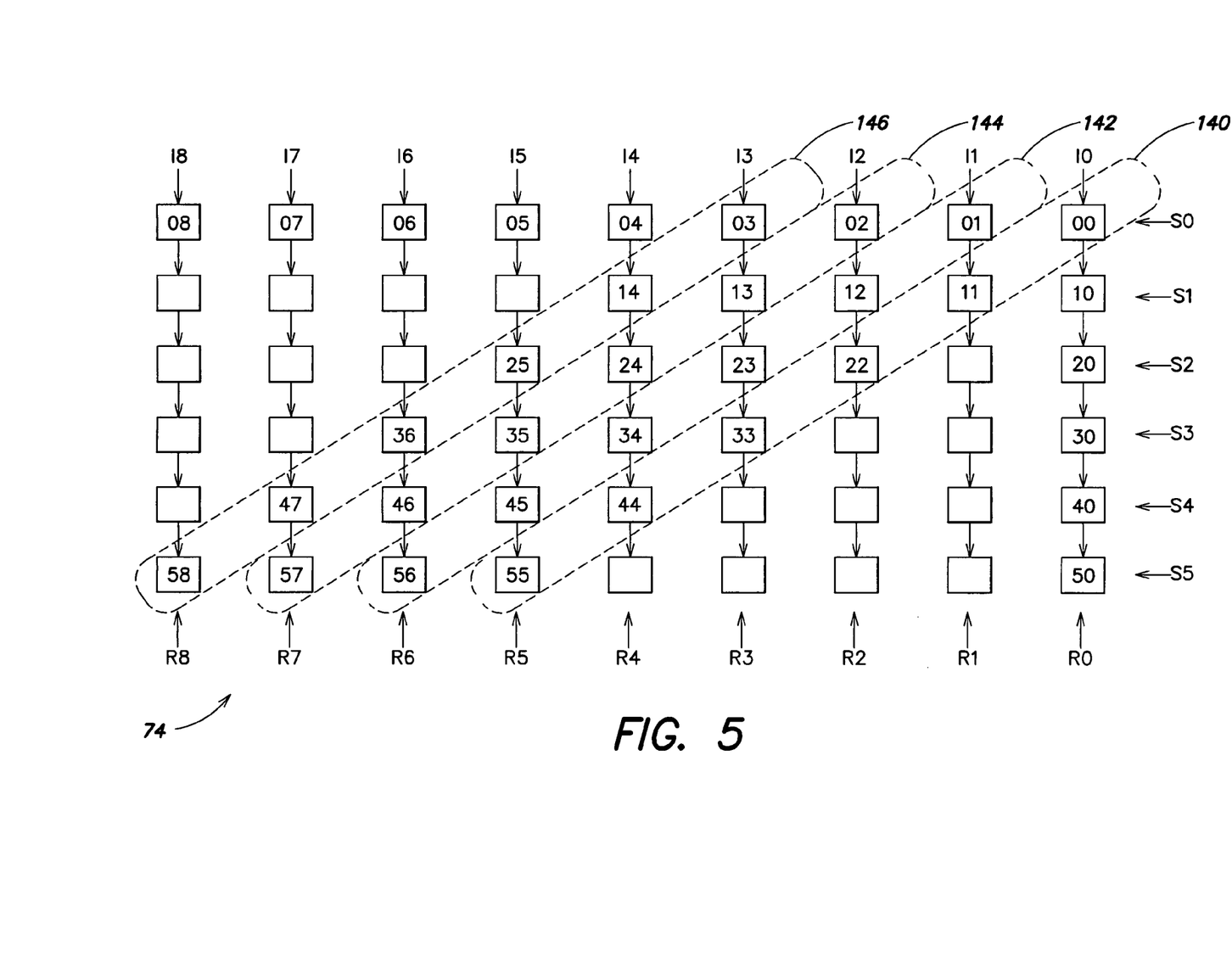
FIG. 5 is a schematic block diagram of the shift register array shown in FIG. 3.

A schematic block diagram of shift register array 74 in accordance with an embodiment of the invention is shown in FIG. 5. The shift register array 74 includes shift registers R0-R8, each having stages S0-S5. In the embodiment of FIG. 5, shift register array 74 includes nine shift registers, one corresponding to each pixel value in input buffer 70, and each shift register has six stages, one corresponding to each stage of the interpolation filters. As noted below, unused shift register stages may be omitted.

Input pixel values are shifted into the first stages S0 of shift register array 74 from input buffer 70 and are shifted through the stages of each shift register on successive clock cycles. The first stages S0 of shift registers R0-R3 are connected to the first inputs of interpolation filters F0-F3, respectively. The stages S1-S5 of selected shift registers R1-R8 are connected to the second inputs of interpolation filters F0-F3, respectively. The stages of the shift registers in shift register array 74 are labeled according to the convention [stage, shift register], where "stage" has values from 0 to 5 and "shift register" has values from 0 to 8 in this embodiment. Thus, the third stage of the fourth shift register is labeled [2, 3].

The stages of shift register array 74 that are coupled to interpolation filter array 72 are encircled by dashed lines 140, 142, 144 and 146. The stages encircled by dashed line 140 are coupled to interpolation filter F0; the stages encircled by dashed line 142 are coupled to interpolation filter F1; the stages by dashed line 144 are coupled to interpolation filter F2; and the stages encircled by dashed line 146 are coupled to interpolation filter F3. Thus, stage S0 of shift register R0 (stage [0, 0]) is coupled to the first stage of interpolation filter F0; stage S1 of shift register R1 (stage [1, 1]) is coupled to multiplexer 111 in the second stage of interpolation filter F0; stage S2 of shift register R2 (stage [2, 2]) is coupled to multiplexer 112 in the third stage of interpolation filter F0; stage S3 of shift register R3 (stage [3, 3]) is coupled to multiplexer 113 in the fourth stage of interpolation filter F0; stage S4 of shift register R4 (stage [4, 4]) is coupled to multiplexer 114 in the fifth stage of interpolation filter F0; and stage S5 of shift register R5 (stage [5, 5]) is coupled to multiplexer 115 in the sixth stage of interpolation filter F0. The shift register stages encircled by dashed lines 142, 144 and 146 are connected to interpolation filter F1-F3, respectively, in a similar manner. The inputs provided to interpolation filter array 72 by shift register array 74 have the effect of incrementing horizontally in the pixel array, despite the fact that the process is actually incrementing from top to bottom in the pixel array.

Figure 6A:
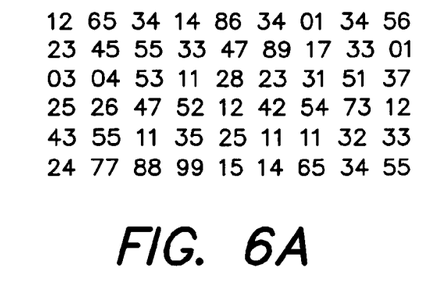
FIG. 6A is a schematic diagram that illustrates an example of pixel values in a 9×6 pixel block of a pixel array.

An example of a 9×6 pixel block is shown in FIG. 6A, with a pixel value shown at each pixel location. FIGS. 6B-6G illustrate loading of the 9×6 pixel block of FIG. 6A into the shift register array 74 on successive clock cycles. The pixel values supplied to interpolation filters F0-F3 are indicated by labels F0-F3 under the pixel values, for each stage of the shift register array. A horizontal half pixel value is produced after the sixth row of pixel values is loaded into shift register array 74.

Figure 6B:
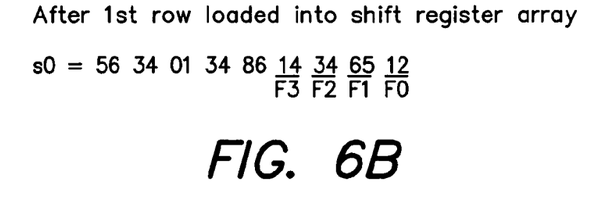
FIGS. 6B-6G are schematic diagrams that illustrate loading of the pixel values in FIG. 6A into the half pixel interpolator of FIG. 3.
Figure 6C:
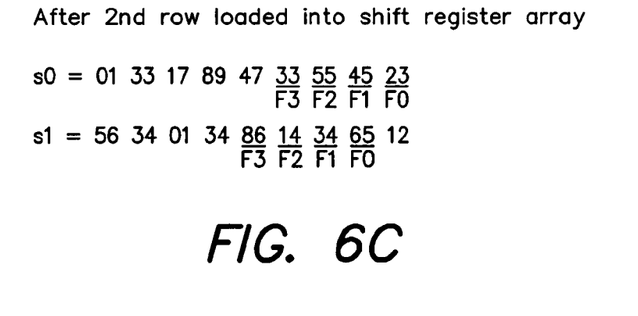
Figure 6D:
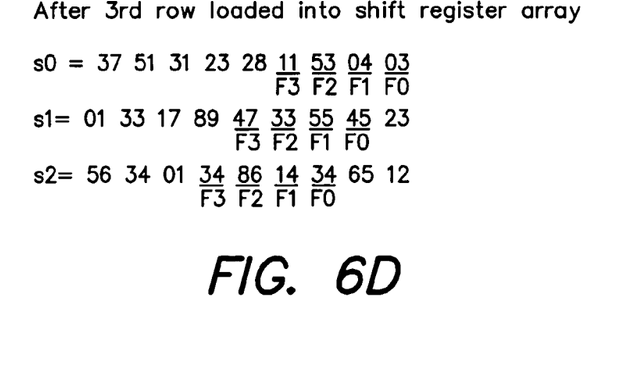
Figure 6E:
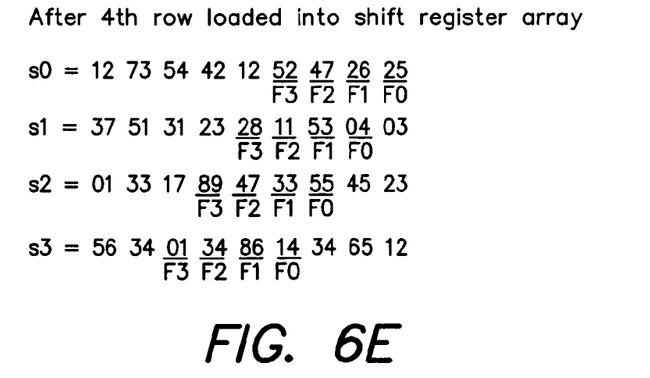
Figure 6F:
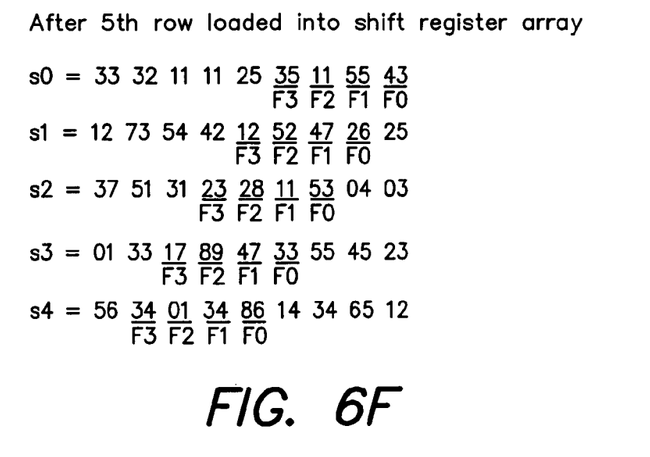
Figure 6G:
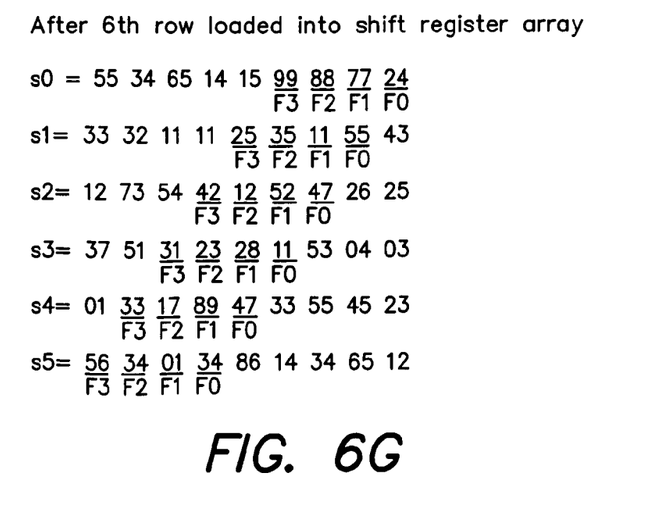

Horizontal interpolation may be understood by following a row of pixel values in FIG. 6A through one of the interpolation filters, such as filter F0. In FIG. 6B, the first row of pixel values from FIG. 6A is loaded into the first stages S0 of the shift register array 74 and the pixel value "12" is provided to stage S0 of filter F0. In FIG. 6C, the first row of pixel values is shifted to the second stages S1 of the shift register array 74 and the pixel value "65" is provided to stage S1 of filter F0. In stage S1 of filter F0, the pixel values "12" and "65" are combined according to the values of the filter coefficients. This process continues through the shift register array 74 and each of the filters F0-F3. In FIG. 6G, the first row of pixel values is shifted to the sixth stages S5 of the shift register array 74 and the pixel value "34" is provided to stage S5 of filter F0. After 6 clock cycles, filter F0 outputs a horizontal half pixel value that represents the interpolation of pixel values "12", "65", "34", "144", "86" and "34" in the first row of the pixel array of FIG. 6A. On the next clock cycle, filter F0 outputs a horizontal half pixel value that represents the interpolation of the first six pixel values in the second row of the pixel array of FIG. 6A. Filter F0 thus outputs a horizontal half pixel value on each clock cycle after an initial latency of six clock cycles.

The half pixel interpolation module takes as an input a 24×24 pixel block centered around the motion vector resulting from a previous integer search and generates half pixel values corresponding to the interpolation filtering required by the H.264 standard for the subsequent half pixel and quarter pixel searches. The H.264 standard requires 6-tap horizontal and vertical filters for half pixel interpolation. As discussed above, the half pixel interpolation module uses four interpolation filters which operate in both horizontal and vertical modes, the difference between the two modes being (a) the input data loaded into the filters (i.e., integer or half pixel data), (b) the way in which each interpolation filter is loaded from the array, and (c) whether clipping is performed on the output.

The half pixel interpolator may be controlled by controller 50 (FIG. 2) implemented as a finite state machine which cycles through three operations, as discussed below in connection with FIGS. 7-9, to generate all half pixels, including vertical half pixels, horizontal half pixels and diagonal half pixels (which correspond to the "j" pixels in the H.264 standard).

The first operation includes six vertical top-to-bottom passes through the 24×24 pixel block to generate the vertical half pixels. These half pixels are generated by loading integer pixel data into the interpolation filters F0, F1, F2 and F3 configured in the first or vertical mode. In the first mode, each interpolation filter receives pixel data at its first input. The input to each stage is the new row of pixel data being loaded from integer pixel buffer 42 into input buffer 70 and then into the shift register array 74. After six cycles, an output is generated on each clock cycle and the results are stored at full resolution (16 bits) into the vertical half pixel buffer 44 (FIG. 2). The vertical half pixels are used for further interpolations (full resolution) as well as for subsequent half pixel and quarter pixel searches (clipped to 8 bits).

The second operation of half pixel interpolation is generation of the horizontal half pixels, in five vertical top-to-bottom passes through the 24×24 pixel block. Each new row of pixel data is loaded from integer pixel buffer 42 into input buffer 70 and then into shift register array 74. The input buffer 70 is used to load pixels into the half pixel interpolator, but the interpolation filters are configured to operate in the second or horizontal mode. In the second mode, each interpolation filter receives pixel data at its second inputs. The second inputs to each interpolation filter are from corresponding stages of the shift register array 74 along a diagonal as described above. Since horizontal half pixels are not required for further interpolation, the final result of each filtering operation is clipped to 8 bits and is stored in the horizontal half pixel buffer 46.

The third operation of half pixel interpolation is generation of the diagonal half pixels, in five vertical top-to-bottom passes through 24×24 pixel block. Diagonal half pixel generation is performed in a similar fashion to the horizontal half pixels, except that the input pixel data is the previously-generated vertical half pixel data that was stored in vertical half pixel buffer 44 at full resolution. The vertical half pixel data is loaded from vertical half pixel buffer 44 to input buffer 70 and then into shift register array 74. In this operation, the interpolation filters are again configured to operate in the second or horizontal mode, and second inputs are received from pixel shift register 74. The results are output to the diagonal half pixel buffer 48, and are stored clipped to 8 bits.

Figure 7:
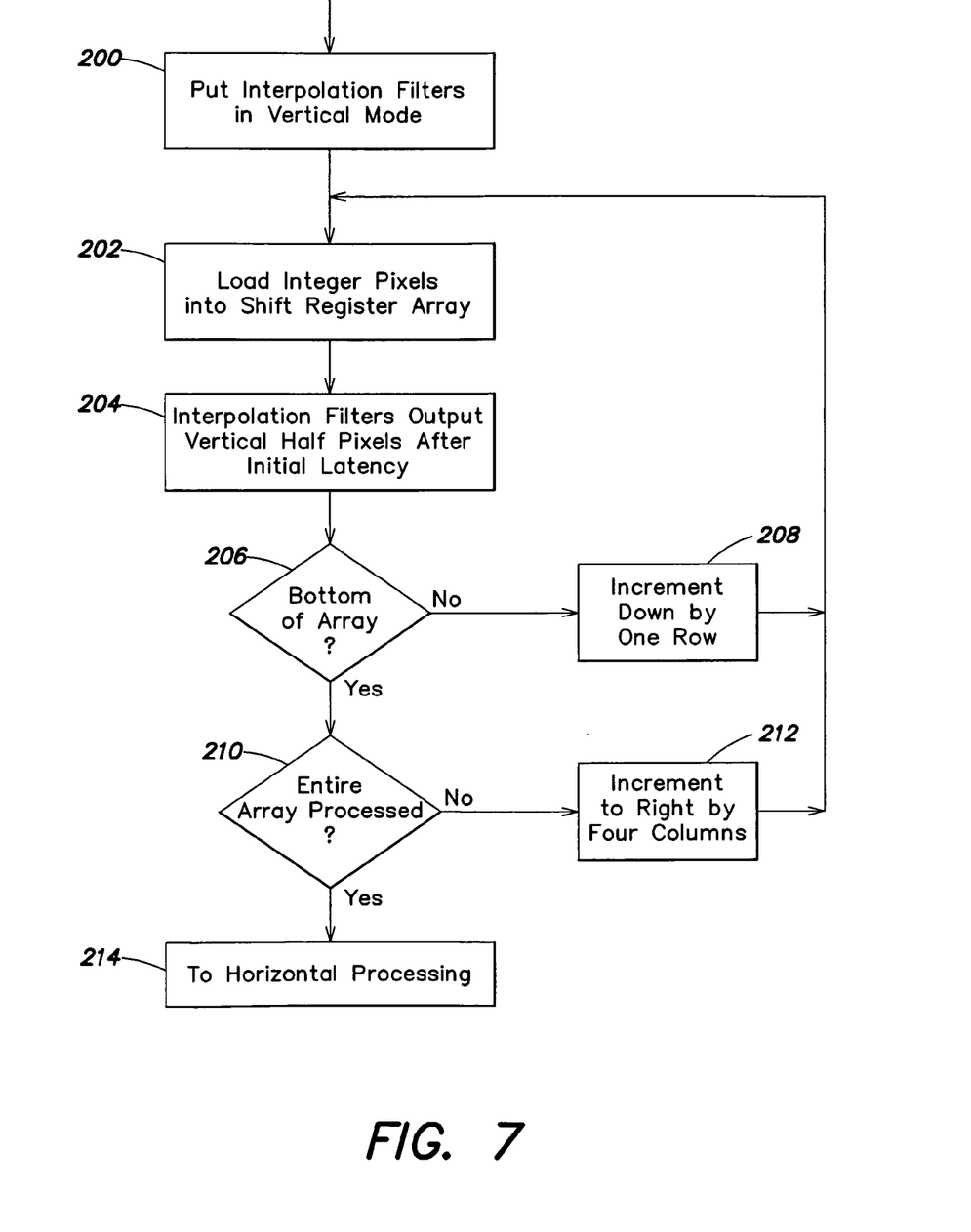
FIG. 7 is a flow chart that illustrates a process for vertical half pixel interpolation in accordance with an embodiment of the invention.

An embodiment of a process for vertical half pixel interpolation is shown in the flow chart of FIG. 7. In act 200, interpolation filters F0, F1, F2 and F3 are configured to operate in the first or vertical mode. In the first mode, the multiplexers in each interpolation filter select the first input of the interpolation filter from the first stages S0 of shift registers R0-R3. In act 202, integer pixels are loaded from integer pixel buffer 42 into input buffer 70, from input buffer 70 into shift registers R0-R3 and then from shift registers R0-R3 into interpolation filter F0-F3. In act 204, the interpolation filters output vertical half pixel values after an initial latency. In the case of six-stage interpolation filters, outputs are supplied after an initial latency of six clock cycles. In act 204, a determination is made as to whether processing has reached the bottom of the pixel array. If the process has not reached the bottom of the array, the process increments down by one row in act 208 and returns to act 202 to load the integer pixels for the next row of the pixel array. Vertical half pixels are output in act 204 after the loop including acts 202, 204, 206 and 208 has been executed six times. If it is determined in act 206 that the bottom of the array has been reached, a determination is made in act 210 whether the entire array has been processed. If the entire array has not been processed, the process increments to the right in the array by four columns in act 212. The process then returns to act 202 to load pixels in the first row of the second group of four columns. The process continues in this manner until the entire 24×24 pixel block has been processed. The process of FIG. 7 utilizes six vertical top-to-bottom passes in the case of a 24×24 pixel block and four interpolation filters. When the entire array has been processed, the process proceeds to horizontal processing in act 214.

It is noted that act 212 involves incrementing to the right by four columns in the pixel array after each group of four columns has been processed. By contrast, FIGS. 3-5 illustrate pixel numbering increasing from right to left. The apparent inconsistency results from the way pixel values are typically stored in memory. Thus, for example, interpolation filter F0 processes the first column of the pixel array, interpolation filter F1 processes the second column of the pixel array, etc.

Figure 8:
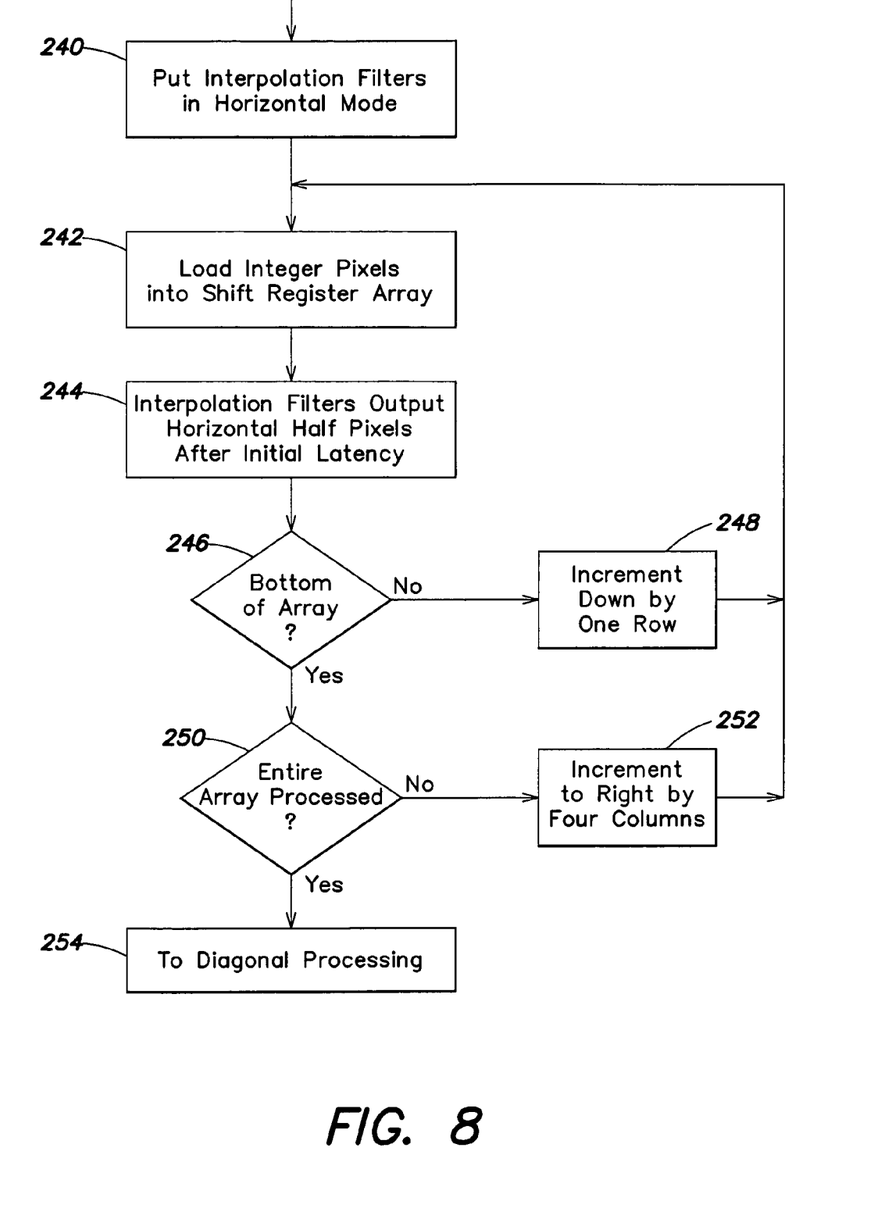
FIG. 8 is a flow chart that illustrates a process for horizontal half pixel interpolation in accordance with an embodiment of the invention.

An embodiment of a process for horizontal half pixel processing is shown in the flow chart of FIG. 8. In act 240, the interpolation filters F0, F1, F2 and F3 are configured to operate in the second or horizontal mode. In the second mode, the multiplexers in each of the interpolation filters select inputs from the shift register array 74 as described above. In act 242, integer pixels are loaded from integer pixel buffer 42 into input buffer 70 and then from input buffer 70 into shift register array 74. In particular, nine pixel values are loaded into the nine shift registers R0-R8 of the shift register array 74. The pixel values in the shift register array 74 are supplied to corresponding stages of the interpolation filters F0, F1, F2 and F3 as described above. In act 244, the interpolation filters output horizontal half pixels after an initial latency. In the case of six-stage interpolation filters, horizontal half pixels are output after an initial latency of six clock cycles. In act 246, a determination is made as to whether the bottom of the pixel array has been reached. If the bottom of the array has not been reached, the process increments down by one row in act 248 and returns to act 242. Horizontal half pixels are output in act 244 after the loop including acts 242, 244, 246 and 248 has been executed six times. When the process reaches the bottom of the array, a determination is made in act 250 as to whether the entire array has been processed. If the entire array has not been processed, the process increments to the right by four columns in act 252 and returns to act 242 for processing of the next group of four columns. The process continues until the entire 24×24 pixel block has been processed. The process of FIG. 8 utilizes five vertical top-to-bottom passes in the case of a 24×24 pixel block and four interpolation filters. When the entire array has been processed, the process proceeds to diagonal processing in act 254.

Figure 9:
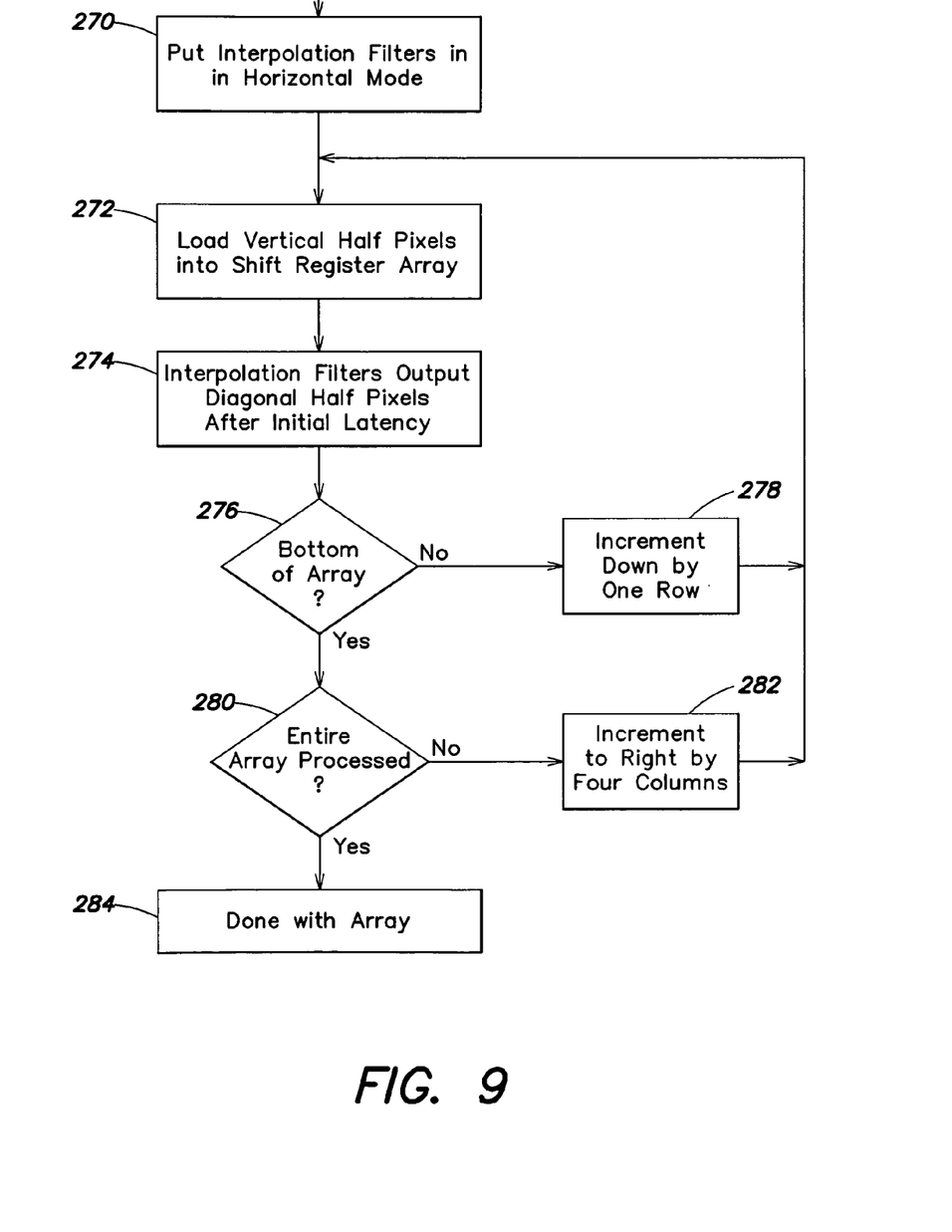
FIG. 9 is a flow chart that illustrates a process for diagonal half pixel interpolation in accordance with an embodiment of the invention.

An embodiment of a process for diagonal half pixel generation is shown in the flow chart of FIG. 9. In act 270, the interpolation filters are configured to operate in the second or horizontal mode. In the second mode, the multiplexers in each of the interpolation filters receive inputs from the shift register array 74 as described above. In act 272, the vertical half pixels that were generated in the process of FIG. 7 are loaded from vertical half pixel buffer 44 into input buffer 70 and then from input buffer 70 into the shift register array 74. The shift register array 74 supplies pixel values to respective stages of the interpolation filters F0, F1, F2 and F3 as described above. In act 274, the interpolation filters output diagonal half pixels after an initial latency. In the case of six-stage interpolation filters, the initial latency is six clock cycles. In act 276, a determination is made as to whether the bottom of the pixel array has been reached. If the bottom of the pixel array has not been reached, the process increments down the array by one row in act 278 and returns to act 272. Diagonal half pixels are output by the interpolation filters after the loop including acts 272, 274, 276 and 278 has been executed six times. When the bottom of the array has been reached, a determination is made in act 280 as to whether the entire array has been processed. If the entire array has not been processed, process increments to the right by four columns in act 282 and returns to act 272. The process continues until the entire 24×24 pixel block has been processed. The process of FIG. 9 utilizes five vertical top-to-bottom passes in the case of a 24×24 pixel block and four interpolation filters. After the entire array has been processed, the process is complete in act 284.

In summary, the circuit used to perform half pixel interpolation may use a small number of six-tap FIR filters which process pixel data in both vertical and horizontal directions of the pixel array, which allows for a very small circuit area. Four dedicated memories are used to provide storage of the interpolated pixel values and the integer pixel data. Rather than supply the input pixel array into the interpolator horizontally row by row, which would require 24 filters, the data is loaded in five or six vertical stripes for each mode, using four FIR filters. A state machine is used to control the modes of the filters, which perform vertical interpolation and store the result full scale, followed by horizontal interpolation and then diagonal half pixel interpolation. Despite the small number of FIR filters, the interpolator completes the processing of a 24×24 integer pixel block in just 734 cycles.

Figure 10A:
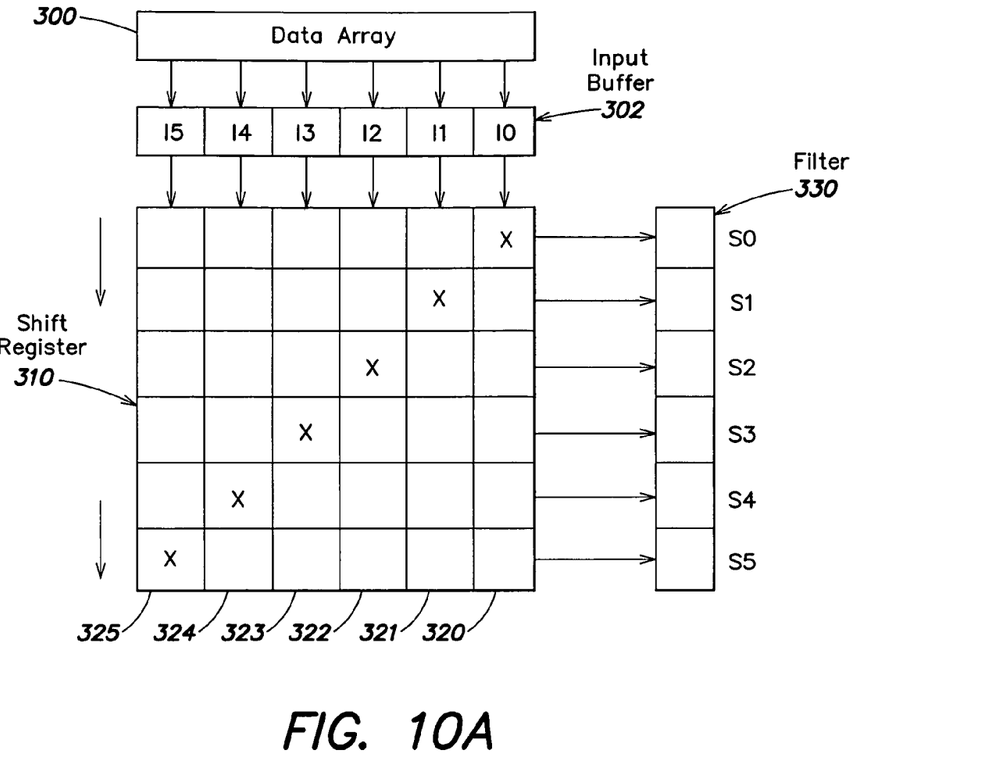
FIG. 10A is a schematic block diagram of a two-dimensional digital filter in accordance with embodiments of the invention.

Apparatus for filtering of data values in a data array 300 is shown in the schematic block diagram of FIG. 10A. The data array 300, which may be stored in a memory, has rows and columns of data values, and the filtering apparatus of FIG. 10A provides two-dimensional filtering of the data values in the data array. An input buffer 302 receives the data values in rows of the data array. The data values are supplied to a shift register array 310 having shift registers 320, 321, 322, 323, 324 and 325, each having six stages S0-S5. Rows of data values are shifted downwardly through the shift register array 310 on successive clock cycles. Predetermined stages of shift registers 320-325 are connected to a digital filter 330 having stages S0-S5. The digital filter 330 may be configured as an FIR filter corresponding to one of the interpolation filters shown in FIG. 4 and described above. In a first mode, stage S0 of shift register 320 is coupled to stages S0-S5 of filter 330. In a second mode, stages of shift registers 320-325 marked with "x" are connected to corresponding stages of filter 330.

In operation, one or more columns of data values in the data array are processed in the first mode. The filter may then be switched to the second mode, and data values from predetermined stages of the shift register array 310 are supplied to filter 330 to provide horizontal processing of data values. Thus, data values in rows and columns of the data array can be processed with the apparatus of FIG. 10A, using a single digital filter.

Figure 10B:
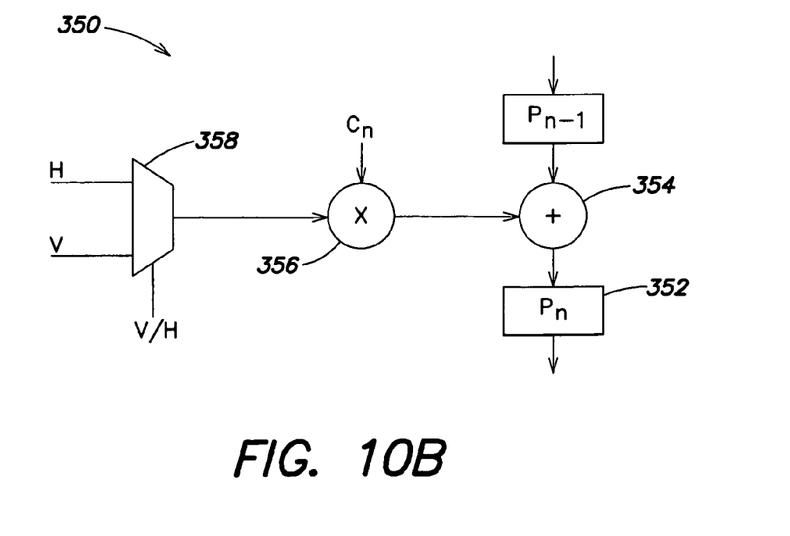
FIG. 10B is a schematic block diagram of a stage of the digital filter of FIG. 10A.

Another embodiment of a digital filter stage is shown in the schematic block diagram of FIG. 10B. A filter stage 350 includes a latch 352, an adder 354, a multiplier 356 and a multiplexer 358. The multiplexer 358 supplies a vertical data value V in a first or vertical mode and a horizontal data value H in a second or horizontal mode as described above. The multiplier 356 multiplies the selected data value by a filter coefficient Cn. The adder 354 combines the output of multiplier 356 and the output of a previous stage to provide a sum that is stored in latch 352. In the first stage of the digital filter, the adder 354 can be omitted. In the case where multiplication by the filter coefficient can be achieved by bit shifting, the multiplier 356 can be omitted from each stage of the digital filter.

It will be understood that the half pixel interpolator described herein can be implemented with different numbers of interpolation filters and different numbers of stages in each interpolation filter. It has been found that four interpolation filters provide favorable results. The selection of six stages is based on the H.264 video coding standard. However, other standards or design considerations may require a different number of stages. Furthermore, with reference to FIG. 5, the stages of shift registers R0-R4 below and to the right of dashed line 140 may be omitted, since the outputs of these shift register stages are not utilized in the described embodiment.

Although the interpolation process has been described as a series of vertical passes through the pixel array, the invention is not so limited. In other embodiments, half pixel interpolation can be implemented as a series of horizontal passes through the pixel array. In addition, diagonal half pixels can be obtained by vertical interpolation of horizontal half pixels.

Having thus described several aspects of at least one embodiment of this invention, it is to be appreciated various alterations, modifications, and improvements will readily occur to those skilled in the art. Such alterations, modifica- tions, and improvements are intended to be part of this disclosure, and are intended to be within the spirit and scope of the invention. Accordingly, the foregoing description and drawings are by way of example only.

What is claimed is:

1. An apparatus for interpolation of pixels in a pixel array having rows and columns of pixels, the apparatus comprising:
   a shift register array configured to shift pixel values of the pixel array, the shift register array including two or more shift registers;
   an interpolation filter array interconnected to the shift register array, the interpolation filter array including one or more interpolation filters, wherein the interpolation filter array is configured to perform vertical pixel interpolation in a vertical mode and configured to perform horizontal pixel interpolation in a horizontal mode; and
   a controller configured to provide pixel values in columns of the pixel array from the shift register array to respective interpolation filters in the vertical mode and configured to provide pixel values in rows of the pixel array from the shift register array to respective interpolation filters in the horizontal mode, wherein at least one shift register of the shift register array is configured to provide pixel values to the interpolation filter array in both the horizontal and vertical modes.

2. The apparatus of claim 1, wherein stages of the shift registers are connected to corresponding stages of the interpolation filters.

3. The apparatus of claim 2, further comprising an input buffer to hold pixel values of the pixel array, the input buffer coupled to the shift register array.

4. The apparatus of claim 2, wherein the interpolation filter array includes four FIR (Finite Impulse Response) interpolation filters, each having six stages and the shift register array includes nine shift registers.

5. The apparatus of claim 2, wherein the interpolation filter array includes m interpolation filters each having n stages and wherein the shift register array includes m+n−1 shift registers.

6. The apparatus of claim 1, wherein the controller is configured to provide integer pixel values in columns of the pixel array to respective interpolation filters in the vertical mode to generate vertical sub-pixel values and is configured to provide integer pixel values in rows of the pixel array to respective interpolation filters in the horizontal mode to generate horizontal sub-pixel values.

7. The apparatus of claim 6, wherein the controller is further configured to provide vertical sub-pixel values to respective interpolation filters in the horizontal mode to generate diagonal sub-pixel values.

8. The apparatus of claim 1, wherein each of the interpolation filters selects a first input from the shift register array in the vertical mode and selects second inputs from the shift register array in the horizontal mode.

9. The apparatus of claim 3, wherein the controller is configured to load integer pixel values into the input buffer during generation of vertical sub-pixel values and during generation of horizontal sub-pixel values, and to load vertical sub-pixel values into the input buffer during generation of diagonal sub-pixel values.

10. The apparatus of claim 1, wherein the controller is further configured to sequence through the pixel array to generate vertical sub-pixel values in a first pass, to sequence through the pixel array to generate horizontal sub-pixel values in a second pass and to sequence through the vertical sub-pixel values to generate diagonal sub-pixel values in a third pass.

11. A method for interpolation of pixels in a pixel array having rows and columns of pixels, comprising:
    providing a shift register array including two or more shift registers and an interpolation filter array interconnected to the shift register array, the interpolation filter array including one or more interpolation filters;
    shifting pixel values of the pixel array through the shift registers of the shift register array;
    supplying pixel values in columns of the pixel array from the shift register array to respective interpolation filters in a vertical mode to generate vertical sub-pixel values; and
    supplying pixel values in rows of the pixel array from the shift register array to respective interpolation filters in a horizontal mode to generate horizontal sub-pixel values, wherein at least one shift register of the shift register array is configured to provide pixel values to the interpolation filter array in both the horizontal and vertical modes.

12. The method of claim 11, further comprising supplying vertical sub-pixel values from stages of the shift registers to corresponding stages of the interpolation filters to generate diagonal sub-pixel values.

13. The method of claim 11, wherein providing an interpolation filter array comprises providing four FIR (Finite Impulse Response) digital filters, each having six stages, and wherein providing a shift register array comprises providing nine shift registers.

14. The method of claim 11, wherein supplying pixel values from the shift register array comprises supplying pixel values from stages of the shift registers to corresponding stages of the interpolation filters.

15. The method of claim 12, further comprising providing an input buffer coupled to the shift register array and loading integer pixel values into the input buffer during generation of vertical sub-pixel values and during generation of horizontal sub-pixel values, and loading vertical sub-pixel values into the input buffer during generation of diagonal sub-pixel values.

16. The method of claim 12, further comprising sequencing through the pixel array to generate vertical sub-pixel values in a first pass, sequencing through the pixel array to generate horizontal sub-pixel values in a second pass, and sequencing through the vertical sub-pixel values to generate diagonal sub-pixel values in a third pass.

17. An apparatus for filtering of data values in a data array having rows and columns of data values, comprising:
    a shift register array to shift data values of the data array;
    a digital filter interconnected to the shift register array, wherein the digital filter is configured to perform vertical pixel interpolation in a vertical mode and configured to perform horizontal pixel interpolation in a horizontal mode; and
    a controller configured to supply data values in columns of the data array from the shift register array to the digital filter in a vertical mode and to supply data values in rows of the data array of the shift register array to the digital filter in a horizontal mode, wherein at least one shift register of the shift register array is configured to provide pixel values to the digital filter in both the horizontal and vertical modes.

18. The apparatus of claim 17, wherein stages of the shift registers are connected to corresponding stages of the digital filter.

19. The apparatus of claim 17, wherein the shift register array is interconnected to the digital filter to supply data values in a column of the data array to the stages of the digital filter on successive clock cycles in the vertical mode.

20. The apparatus of claim 17, wherein the shift register array is interconnected to the digital filter to supply data values in a row of the data array to successive stages of the digital filter on successive clock cycles.

21. A method for filtering data values in a data array having rows and columns of data values, comprising:
providing a shift register array including two or more shift registers and a digital filter array interconnected to the shift register array, the digital filter array including one or more digital filters;
shifting pixel values of the data array through the shift registers of the shift register array;
supplying pixel values in columns of the data array from the shift register array to respective digital filters in a vertical mode to generate vertical sub-pixel values; and
supplying pixel values in rows of the data array from the shift register array to respective digital filters in a horizontal mode to generate horizontal sub-pixel values, wherein at least one shift register of the shift register array is configured to provide pixel values to the digital filter array in both the horizontal and vertical modes.

22. The method of claim 21, further comprising supplying vertical sub-pixel values from stages of the shift registers to corresponding stages of the digital filters to generate diagonal sub-pixel values.

23. The method of claim 21, wherein providing a digital filter array comprises providing four FIR (Finite Impulse Response) digital filters, each having six stages, and wherein providing a shift register array comprises providing nine shift registers.

24. The method of claim 21, wherein supplying pixel values from the shift register array comprises supplying pixel values from stages of the shift registers to corresponding stages of the digital filters.

25. The method of claim 24, further comprising providing an input buffer coupled to the shift register array and loading integer pixel values into the input buffer during generation of vertical sub-pixel values and during generation of horizontal sub-pixel values, and loading vertical sub-pixel values into the input buffer during generation of diagonal sub-pixel values.

26. The method of claim 24, further comprising sequencing through the data array to generate vertical sub-pixel values in a first pass, sequencing through the data array to generate horizontal sub-pixel values in a second pass, and sequencing through the vertical sub-pixel values to generate diagonal sub-pixel values in a third pass.

* * * * *